(12) United States Patent
Kobayashi et al.

(10) Patent No.: US 6,331,932 B1
(45) Date of Patent: Dec. 18, 2001

(54) MONOLITHIC CERAMIC CAPACITOR

(75) Inventors: Fumiyuki Kobayashi, Takefu; Kazuaki Kawabata, Fukui; Yasushi Ueno; Yasunobu Yoneda, both of Takefu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/482,225

(22) Filed: Jan. 13, 2000

(30) Foreign Application Priority Data

Jan. 28, 1999 (JP) .................................................. 11-019939

(51) Int. Cl.$^7$ ....................................................... H01G 4/06
(52) U.S. Cl. ...................... 361/321.2; 361/311; 361/313; 361/321.1
(58) Field of Search ................................. 361/321.2, 311, 361/321.5, 321.4, 321, 322, 313, 321.3

(56) References Cited

U.S. PATENT DOCUMENTS

| | | | | |
|---|---|---|---|---|
| 4,652,967 | * | 3/1987 | Sakabe et al. | 361/309 |
| 5,225,960 | * | 7/1993 | Kishi et al. | 361/321 |
| 5,757,610 | * | 5/1998 | Wada et al. | 361/311 |
| 6,058,005 | * | 5/2000 | Matoba et al. | 361/321.4 |
| 6,233,134 | * | 5/2001 | Sakamoto et al. | 361/311 |
| 6,243,254 | * | 4/2001 | Wada et al. | 361/311 |

\* cited by examiner

*Primary Examiner*—Anthony Dinkins
*Assistant Examiner*—Nguyen Thuc Ha
(74) *Attorney, Agent, or Firm*—Ostrolenk, Faber, Gerb & Soffen, LLP

(57) ABSTRACT

A monolithic ceramic capacitor includes a sintered ceramic compact having a core-shell structure, a plurality of internal electrodes arranged in and separated by the ceramic sintered compact so as to overlap in the thickness direction, and a plurality of external electrodes formed on the outermost faces of the ceramic sintered compact. In the core-shell structure, cores are composed of a particulate dielectric ceramic, and shells are formed on the cores and are composed of a material having a dielectric constant lower than that of the dielectric ceramic. The area ratio of the cores to the shells lies in a range of 7:3 to 3:7 in a cross-section of the sintered ceramic compact in an arbitrary direction. The core-shell structure can achieve further miniaturization and higher capacitance of the monolithic ceramic capacitor, in addition to superior temperature characteristics.

6 Claims, 1 Drawing Sheet

MONOLITHIC CERAMIC CAPACITOR

BACKGROUND OF THE INVENTION

1. Field of the Invention

The present invention relates to monolithic ceramic capacitors suitable for miniaturization and achievement of large capacitance. In particular, the present invention relates to a monolithic ceramic capacitor comprising a ceramic sintered compact having a core-shell structure.

2. Description of the Related Art

Monolithic ceramic capacitors comprising sintered compacts having core-shell structures using barium-titanate-based ferroelectric materials are known. In a ceramic sintered compact having a core-shell structure, a core particle composed of barium-titanate-based ferroelectric ceramic is surrounded by a shell layer composed of a dielectric material having a dielectric constant which is lower than that of the barium titanate. In the production of the ceramic sintered compact having the core-shell structure, ceramic core materials such as $TiO_3$ and $BaCO_3$ in a given formulation are mixed and calcined. The calcined mixture is pulverized. The resulting powder is mixed with materials for forming a shell, e.g., an organic binder, a dispersant and water, to form a ceramic slurry. The ceramic slurry is shaped into a ceramic green sheet by, for example, a doctor blade process. On the ceramic green sheet, a conductive paste containing powdered metal, such as Ag, Ag—Pd, Ni or Cu is applied by printing to form internal electrodes.

Plural ceramic green sheets provided with internal electrodes are laminated together. The resulting laminate is pressed in the vertical direction (thickness direction) and is sintered. External electrodes are formed on the two ends of the resulting sintered compact to form a monolithic ceramic capacitor composed of a ceramic sintered compact having a core-shell structure.

The monolithic ceramic capacitor having such a core-shell structure is said to have satisfactory temperature characteristics.

Recently, monolithic ceramic capacitors are required to be further miniaturized and have higher capacitance. In barium-titanate-based monolithic ceramic capacitors having core-shell structures, however, dielectric constants have not been improved as expected. Thus, further miniaturization and higher capacitance in the barium-titanate-based monolithic ceramic capacitors pose significant problems.

SUMMARY OF THE INVENTION

It is an object of the present invention to provide a monolithic ceramic capacitor of a ceramic sintered compact having a core-shell structure which can achieve further miniaturization and higher capacitance, in addition to superior temperature characteristics.

A monolithic ceramic capacitor in accordance with one aspect of the present invention comprises a sintered ceramic compact having a core-shell structure, comprising cores composed of particulate dielectric ceramic and shells formed on the cores and composed of a material having a dielectric constant lower than that of the dielectric ceramic, at least two internal electrodes arranged in and separated by the ceramic sintered compact so as to overlap in the thickness direction; and at least two external electrodes formed on the outermost faces of the ceramic sintered compact, wherein the area ratio of the cores to the shells lies in a range of 7:3 to 3:7 in a cross-section of the sintered ceramic compact in an arbitrary direction.

Preferably, the particulate dielectric ceramic comprises a particulate barium-titanate-based ceramic.

Preferably, the internal electrodes comprise Ni.

In accordance with another aspect, the invention comprises a sintered ceramic compact for use in forming a monolithic ceramic capacitor, the sintered ceramic comprising a core-shell structure having cores composed of a particulate dielectric ceramic and shells formed on the cores and composed of a material having a dielectric constant lower than that of the dielectric ceramic, the area ratio of the cores to the shells lying in a range of 7:3 to 3:7 in a cross-section of the sintered ceramic compact in an arbitrary direction.

Other features and advantages of the present invention will become apparent from the following description of the invention which refers to the accompanying drawings.

DETAILED DESCRIPTION OF EMBODIMENTS OF THE INVENTION

Figure 1A:
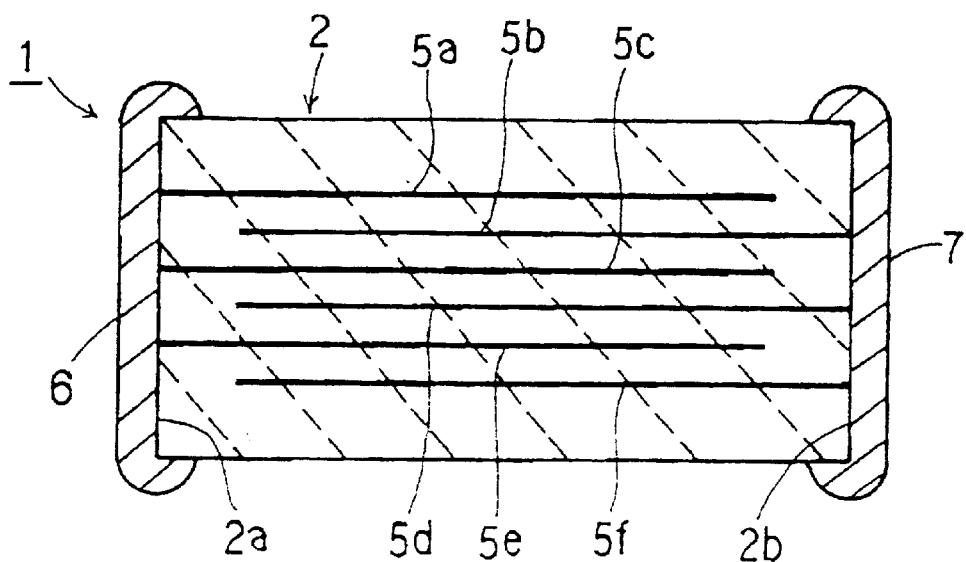
FIG. 1A is a cross-sectional view of an embodiment of a monolithic ceramic capacitor in accordance with the present invention.
Figure 1B:
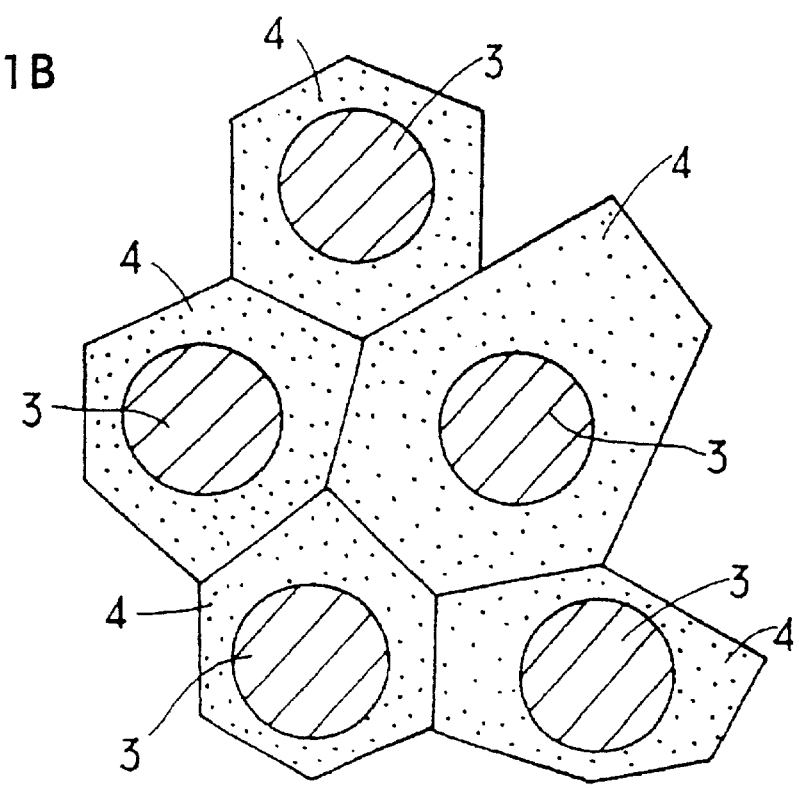
FIG. 1B is an enlarged schematic view of a core-shell structure of a sintered ceramic compact used in the monolithic ceramic capacitor.

FIG. 1A is a cross-sectional view of an embodiment of a monolithic ceramic capacitor in accordance with the present invention, and FIG. 1B is an enlarged schematic view of a core-shell structure of a sintered ceramic compact used in the monolithic ceramic capacitor.

With reference to FIG. 1A, the monolithic ceramic capacitor 1 is composed of a sintered ceramic compact 2 having a core-shell structure. With reference to FIG. 1B, the sintered ceramic compact 2 has a core-shell structure including cores 3 composed of particulate dielectric ceramic surrounded with shells 4 composed of a material having a dielectric constant lower than that of the particulate dielectric ceramic. The area ratio of the cores 3 to the shells 4 lies in a range of 7:3 to 3:7 in a cross-section of the sintered ceramic compact in an arbitrary direction, in order to achieve a high dielectric constant and superior temperature characteristics.

With reference to FIG. 1A, a plurality of internal electrodes 5a to 5f are arranged in and separated by the ceramic sintered compact 2 so as to overlap in the thickness direction. These internal electrodes 5a to 5f may be formed of any metal or alloy, e.g., Ni, Cu, Ag or Ag—Pd. Among these, inexpensive Ni is preferably used.

The internal electrodes 5a, 5c and 5e extend to the left end face 2a of the sintered ceramic compact 2, whereas the internal electrodes 5b, 5d and 5f extend to the right end face 2b. The left and right end faces 2a and 2b are covered with external electrodes 6 and 7. The external electrodes 6 and 7 may be formed by applying and then baking a conductive paste containing Ag or Cu or by plating, depositing or sputtering a conductive material. Alternatively, the external electrodes 6 and 7 may be laminated films formed by any combination of these processes.

The planar shape and the number of the layers of the internal electrodes 5a to 5f, and the configuration of the external electrodes 6 and 7 are not limited in the present invention, as long as the area ratio of the cores to the shells lies in a range of 7:3 to 3:7 in a cross-section of the sintered ceramic compact in an arbitrary direction.

The monolithic ceramic capacitor in accordance with the present invention is suitable for miniaturization and achievement of large capacitance and has superior temperature characteristics, as described in detail with reference to the following EXAMPLES.

EXAMPLES

As powdered starting materials, BaTiO3, $Dy_2O_3$, $Co_2O_3$, $BaCO_3$, MgO, NiO, $MnCO_3$, and an oxide glass primarily composed of BaO—SrO—LiO—$SiO_2$ were mixed, calcined, and then pulverized to form a powdered calcined material.

The powdered calcined material was mixed with an organic vehicle to form a ceramic slurry. A ceramic green sheet having a thickness of 2.5 to 3.0 μm was formed of the ceramic slurry by sheeting. The resulting ceramic green sheet was punched to form rectangular green sheets. A Ni paste was applied onto each rectangular green sheet by printing to form internal electrodes 5a to 5e. Next, a hundred rectangular green sheets provided with the internal electrodes 5a to 5e were laminated, and then twenty-five unprinted rectangular green sheets were deposited on each of the bottom and top faces. The resulting ceramic laminates were pressed in the thickness direction and were sintered at temperatures shown in Table 1 for 2 hours to form sintered ceramic compacts.

A Cu paste was applied onto the two end faces of the resulting sintered ceramic compact and were then baked to form a monolithic ceramic capacitor.

The resulting monolithic ceramic capacitor was subjected to measurement of (1) the core-shell area ratio, (2) electrostatic capacitance and (3) thermal change in capacitance (TCC) and to (4) a high-temperature loading test, as follows.

(1) Core-Shell Area Ratio

The sintered ceramic compact of the monolithic ceramic capacitor was cut in the longitudinal direction and the thickness direction. Each cross-section was observed by a transmission electron microscope (TEM) to determine the area ratio of the core portions and the shell portions.

(2) Thermal Change in Capacitance (TCC)

The static capacitors $C_{20}$ and $C_{85}$ of the monolithic ceramic capacitor were measured at 20° C. and 85° C., respectively, and the ratio TCC (%) of the change in static capacitance DC=$C_{85}$–$C_{20}$ to $C_{20}$ was calculated. The data shown in Table 1 is an average of ten samples.

(3) High-Temperature Loading Test

Twenty-five volts were applied to the monolithic ceramic capacitor at a temperature of 150° C. for an accelerated test. The number of short-circuiting points was evaluated after 100 hours from the accelerated test. The number of short-circuiting points shown in Table 1 is a cumulative number of 200 samples.

TABLE 1

| Sample | Sintering Temperature (° C.) | Core-Shell Area Ratio | Thickness (μm) of Ceramic layer between Internal Electrodes | Dielectric Constant ε | TCC (%) | Number of Short-circuiting Points |
|---|---|---|---|---|---|---|
| 1 | 1,240 | 9:1 | 3.0 | 4,230 | −12 | 5 |
| 2 | 1,260 | 8:2 | 3.0 | 4,760 | −14 | 2 |
| 3 | 1,270 | 7:3 | 3.0 | 5,120 | −20 | 0 |
| 4 | 1,280 | 6:4 | 2.5 | 5,650 | −28 | 0 |
| 5 | 1,280 | 6:4 | 3.0 | 5,340 | −25 | 0 |
| 6 | 1,300 | 5:5 | 2.5 | 5,850 | −25 | 0 |
| 7 | 1,300 | 5:5 | 3.0 | 5,520 | −22 | 0 |
| 8 | 1,330 | 3:7 | 2.5 | 6,260 | −29 | 0 |
| 9 | 1,330 | 3:7 | 3.0 | 5,740 | −20 | 0 |
| 10 | 1,350 | 2:8 | 3.0 | 5,840 | −18 | 2 |

Sample 1 in Table 1 having a core-shell area ratio of 9:1 has a small dielectric constant ε of 4,230, and the number of the short-circuiting points after the high-temperature loading is 5. Sample 2 having a core-shell area ratio of 8:2 has a small dielectric constant ε of 4,760, and the number of the short-circuiting points after the high-temperature loading is 2. It is assumed that insufficient sintering of the ceramic layers between the internal electrodes occurs in Samples 1 and 2 due to a low sintering temperature of 1,260° C. and results in short-circuiting after the high-temperature loading.

In addition, in Sample 10 having a core-shell area ratio of 2:8, the number of the short-circuiting points after the high-temperature loading is 2, although the dielectric constant ε is high, that is, 5,840. It is hypothesized that, in this sample, a high sintering temperature of 1,350° C. and a core-shell area ratio of 2:8 enhance the reactivity of the ceramic particles and that the core area is decreased, increasing the dielectric constant. Moreover, it is hypothesized that high-temperature sintering facilitates grain growth, which accelerates short-circuiting during the high-temperature loading test.

In contrast, Samples 3 to 9 having core-shell area ratios within the scope of the present invention have high dielectric constants e exceeding 5,120 and do not have any short-circuiting points after the high-temperature loading. The thermal change in capacitance TCC lies in a range of +20% to −30%, which satisfies the D characteristic according to the Japanese Industrial Standard (JIS).

Accordingly, the control of the core-shell area ratio within a range of 7:3 to 3:7 in accordance with the present invention can achieve an increase in electrostatic capacitance and an improvement in reliability after the high-temperature loading test, without a decreased thermal change in capacitance.

In Samples 4, 6 and 8, no short-circuiting points are observed after the high-temperature loading regardless of a significantly small thickness of the ceramic layer between internal electrodes of 2.5 μm. These results show that the control of the core-shell area ratio is effective for providing monolithic ceramic capacitors suitable for further miniaturization and larger capacitance.

These experimental results show that the sintering temperature offers the control of the core-shell area ratio within the specific range of 7:3 to 3:7 in accordance with the present invention. Other factors for controlling the core-shell area ratio are, for example, the type and quantity of the material for the shells, and the size of the dielectric ceramic particles as the cores.

In the present invention, any other dielectric ceramic particles, for example, strontium titanate-based dielectric ceramic particles may be used, in place of the barium-titanate-based ceramic particles used in the above examples.

In place of the powdered oxide glass primarily composed of BaO—SrO—LiO—$SiO_2$, the shells may be formed of any other materials having dielectric constants which are lower than that of the ceramic particles. Examples of such materials include Zn, PbO, and $B_2O_3$.

As described above, the monolithic ceramic capacitor in accordance with the present invention is characterized in that the area ratio of the cores to the shells lies in a range of 7:3 to 3:7 in a cross-section of the sintered ceramic compact in an arbitrary direction. The monolithic ceramic capacitor having such a configuration has increased electrostatic capacitance and a reduced number of short-circuiting sites after high-temperature loading, without deterioration of superior capacitor-temperature dependence inherent in monolithic capacitors having core-shell structures. Accordingly, the monolithic ceramic capacitor can be further miniaturized and have higher capacitance, in addition to having superior temperature characteristics.

Moreover, in the present invention, a large electrostatic capacitance can be achieved by using barium-titanate-based ceramic particles, which produces less environmental effects compared to lead perovskite ceramic materials having high dielectric constants which are used in conventional high-capacitance ceramic capacitors. In addition, use of Ni as the internal electrodes contributes to reduced material costs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A monolithic ceramic capacitor comprising:

a sintered ceramic compact having a core-shell structure comprising cores composed of a particulate dielectric ceramic and shells formed on the cores and composed of a material having a dielectric constant lower than that of the dielectric ceramic;

at least two internal electrodes arranged in and separated by the ceramic sintered compact so as to overlap in the thickness direction; and at least two external electrodes formed on the outermost faces of the ceramic sintered compact;

wherein the area ratio of the cores to the shells lies in a range of 7:3 to 3:7 in a cross-section of the sintered ceramic compact in an arbitrary direction.

2. A monolithic ceramic capacitor according to claim 1, wherein the particulate dielectric ceramic comprises a particulate barium-titanate-based ceramic.

3. A monolithic ceramic capacitor according to claim 1, wherein the internal electrodes comprise Ni.

4. A monolithic ceramic capacitor according to claim 2, wherein the internal electrodes comprise Ni.

5. A sintered ceramic compact for use in forming a monolithic ceramic capacitor, comprising:

a core-shell structure having cores composed of a particulate dielectric ceramic and shells formed on the cores and composed of a material having a dielectric constant lower than that of the dielectric ceramic, the area ratio of the cores to the shells lying in a range of 7:3 to 3:7 in a cross-section of the sintered ceramic compact in an arbitrary direction.

6. A sintered ceramic compact according to claim 5, wherein the particulate dielectric ceramic comprises a particulate barium-titanate-based ceramic.

* * * * *